Nov. 22, 1966  J. WALTER ETAL  3,286,971

VEHICLE SEAT

Filed Aug. 16, 1965  3 Sheets-Sheet 1

INVENTORS
JOHANNES WALTER
INGOMAR PELZ

BY  Dicke & Craig

ATTORNEYS

FIG. 2

Nov. 22, 1966  J. WALTER ETAL  3,286,971
VEHICLE SEAT

Filed Aug. 16, 1965  3 Sheets-Sheet 3

INVENTORS
JOHANNES WALTER
INGOMAR PELZ

BY  Dicke + Craig

ATTORNEYS

United States Patent Office 3,286,971
Patented Nov. 22, 1966

3,286,971
VEHICLE SEAT
Johannes Walter and Ingomar Pelz, both of Sindelfingen, Wurttemburg, Germany, assignors to Daimler-Benz Aktiengesellschaft, Stuttgart-Unterturkheim, Germany
Filed Aug. 16, 1965, Ser. No. 480,007
Claims priority, application Germany, Aug. 27, 1964, D 45,279
25 Claims. (Cl. 248—429)

The present invention relates to an adjustable vehicle seat especially intended for commercial type vehicles.

It is the aim of the present invention to constitute the adjustability of the seat in the longitudinal direction, in the height and in the inclination of the seat cushion and of the backrest as versatile as possible; and more particularly to do so with the simplest structural means in order to enable, on the one hand, an inexpensive manufacture of the seat and on the other, to obtain a sturdy type of construction reliable in operation, especially of the adjusting means, and to facilitate for the driver the adjustment of the seat into every position desired by the driver. Additionally, in accordance with the present invention the driver is to be able to displace the seat relatively far toward the rear for purposes of boarding and leaving the vehicle and then, without special attention, to be able to return the seat forcibly to the initial position thereof so as to save to the driver a renewed searching each time for the position most favorable to him. In particular, the seat is also to be suitable for such vehicles which require, by reason of their multiple applicability, at least for short periods of time an extremely high and steep position of the seat without, however, impairing thereby the other adjustabilities of the seat.

The present invention thereby starts with a known longitudinally displaceable seat in which sliding rails secured at the bottom side of the seat frame are displaceably guided in the vehicle longitudinal direction within guide rails arranged securely at the vehicle floor and which can be held stationary in the desired position by appropriate detent means.

The present invention essentially consists, on the one hand, in that the guide rails are readily detachably secured at the vehicle floor by rapidly detachably securing or fastening means and, on the other, in that an intermediate frame is provided adapted to be selectively inserted between the guide rails and the vehicle floor which intermediate frame is provided at its bottom edge with receiving apertures for the rapid securing or fastening means arranged at the vehicle floor and at its upper edge with the rapid securing or fastening means corresponding in the type and arrangement to those arranged at the vehicle floor. In a preferred embodiment of the present invention, the intermediate frame essentially consists of one quadrangular, preferably trapezoidally shaped sectional steel frame on each side of the seat whose upper leg portion appropriately slopes slightly downwardly in the forward direction.

In order to render the adjustability of the seat in the vehicle longitudinal direction independently of whether the intermediate frame is or is not inserted between the seat and the vehicle floor, a detent rail connected with the seat is slidingly guided in at least one of the guide rails of essentially U-shaped cross section open toward the top. This detent rail is provided with a longitudinad slot through which extends a securing bolt arranged transversely with respect thereto and displaceably supported within the guide rail in its longitudinal direction. The longitudinal slot of the detent rail is enlarged at approximately equal distances into a series of detent apertures into which the securing bolt is able to engage under the effect of a spring with its local enlargement of the shank thereof in order to be able to hold the seat fixed in the respectively desired position.

Particularly when the vehicle is used for operations for which the seat has to be brought, by the insertion of the intermediate frame, into a relatively high and steep position and simultaneously has to be displaced relatively far toward the front, it may be necessary to displace the seat for purposes of boarding or leaving the vehicle each time relatively far toward the rear and immediately thereafter to return the seat forwardly again into its normal operating position. In order to save for the driver in that case to search each time anew for the correct detent aperture in the detent rail, the detent rail according to a further feature of the present invention is readily detachably connected with the seat, for example, by a pivotal locking lever supported at the seat which engages under the effect of a spring in a cut-out or aperture provided in the detent rail. If the locking lever is manually disengaged out of the detent rail, then the seat can be moved to and fro in any suitable manner on the guide rails without displacing at the same time the detent rail in unison therewith. Consequently, the seat, when being pushed back, comes back necessarily exactly into its pre-existing position in which the locking lever automatically engages again the cut-out or aperture of the detent rail under the spring effect.

Accordingly, it is an object of the present invention to provide an adjustable seat for motor vehicles which, by extremely simple means, renders the adjustability of the seat in the longitudinal direction, in its height as well as in its inclination of the seat cushion and backrest as versatile as possible without impairing its reliability of operation.

Another object of the present invention resides in the provision of a seat for motor vehicles which offers great versatility in its adjustability, yet can be manufactured in a relatively inexpensive manner without sacrifice in the sturdiness of construction thereof.

A further object of the present invention resides in the provision of adjusting means for a vehicle seat greatly improving the versatility of adjustment of the seat yet minimizing in a significant manner the cost of manufacture, installation and servicing especially of the adjusting means.

Still another object of the present invention resides in an adjustable vehicle seat for motor vehicles which greatly facilitates, by simple adjusting means, the adjustment of the seat by the driver to the individually desired position.

Still a further object of the present invention resides in the provision of a vehicle seat which not only is adjustable in a far-reaching manner but also facilitates the ingress and egress of the driver and/or passengers by permitting facilitated displacement of the seat in the longitudinal direction.

Another object of the present invention resides in the provision of an adjustable seat for motor vehicles which not only can be adjusted in the longitudinal direction, in its height and inclination of the seat cushion and backrest, but which also permits the driver to temporarily adjust the seat in the longitudinal direction yet permits the driver to automatically locate the pre-existing selected longitudinal position of the seat when returning the same in the longitudinal direction toward the initial position.

A further object of the present invention resides in a vehicle seat which greatly facilitates to the driver the adjustment of the seat in the longitudinal direction without requiring renewed searching for the most favorable seat position everytime such longitudinal adjustment is made.

Still another object of the present invention resides in the provision of an adjustable vehicle seat which not only entails all the advantages mentioned above but which also permits the use of the seat for temporarily raising and inclining the seat in an extreme manner, for example, when using the vehicle for special purpose operations without impairing the adjustability of the seat in the various ways otherwise available.

These and other objects, features and advantages of the present invention will become more obvious from the following description when taken in connection with the accompanying drawing which shows for purposes of illustration only, one embodiment in accordance with the present invention, and wherein.

Figure 1:
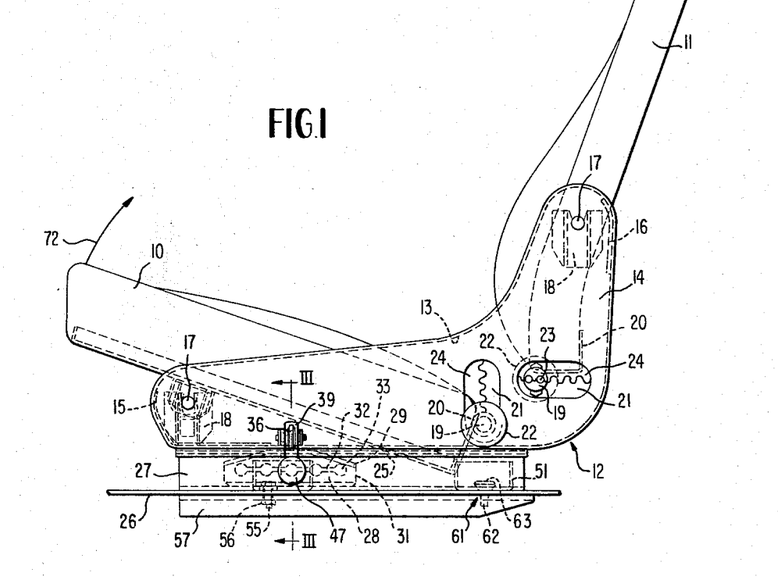
FIGURE 1 is a side elevational view of a vehicle seat in accordance with the present invention.
Figure 2:
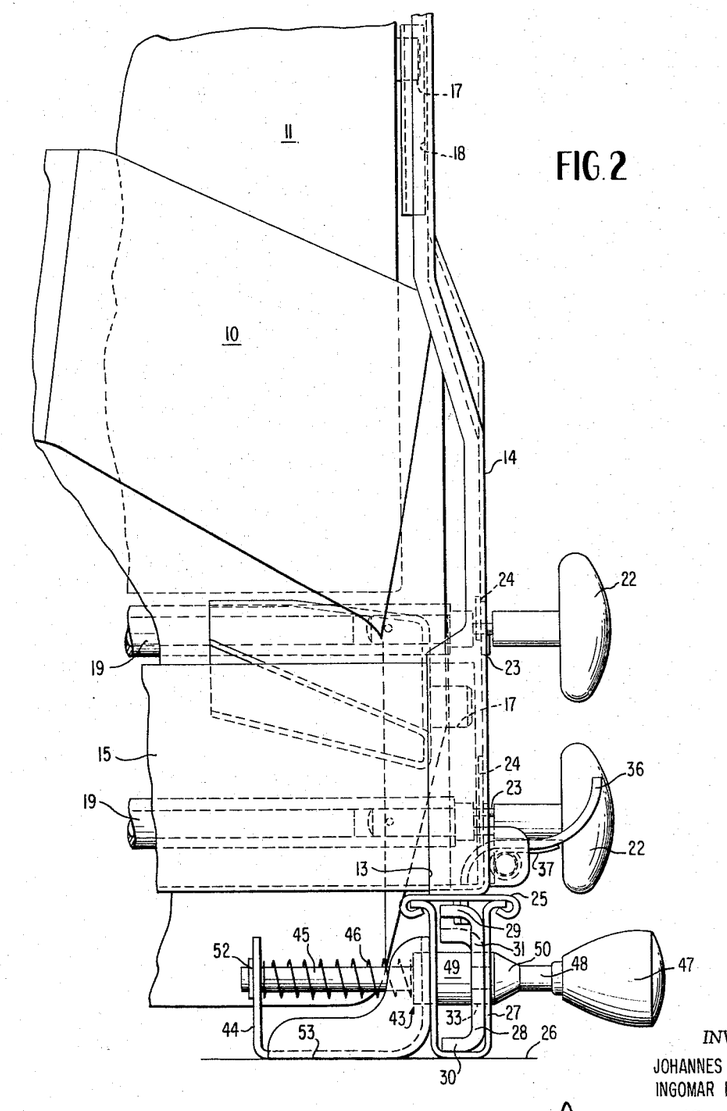
FIGURE 2 is a partial front elevational view of the seat in accordance with the present invention, on a larger scale than the side elevational view of FIGURE 1.

Referring now to FIGURES 1 and 2 of the drawing wherein like reference numerals are used throughout the various views to designate like parts, the seat cushion 10 and the backrest 11 of the seat are suspended in a frame generally designated by reference numeral 12 which essentially consists of the angularly shaped or sectionally shaped lateral parts 14 reinforced at the rims thereof by flanges 13 and of the cross rails 15 and 16 connecting the lateral parts 14 in front and in the rear thereof. The parts 14, 15 and 16 are preferably made of sheet metal by appropriate pressing or stamping and are welded together. The seat cushion 10 and the backrest 11 are each provided on both sides with lateral pins 17 projecting therefrom by means of which they rest pivotally in bearing brackets 18 arranged on the inside of the lateral parts 14 and open toward the top.

At the rear end of the seat cushion 10 and at the lower end of the backrest 11, one transverse shaft 19 is rotatably supported in bands 20 rolled of band steel and angularly bent which are suitably secured at the seat cushion 10 and backrest 11, respectively. The shafts 19 project on both sides through elongated elliptically shaped slots 21 in the lateral parts 14 and are provided at the ends thereof with turning knobs or handles 22. The shafts 19 engage by means of gear or pinion drive means 23, for example, of the mangle wheel type, which are arranged on shafts, into short toothed segments 24 which are securely arranged within the area of the slots 21 on the inside of the lateral parts 14. During rotation of the shafts 19 by means of the handles or knobs 22, the respective tooth means 23 rolls off along the corresponding toothed segment 24 and thereby changes the inclination of the seat cushion 10 or backrest 11, respectively, by pivoting thereof about the pins 17 in the desired manner. By reason of the self-locking feature of such pinion drive means, which may be of any known conventional construction, any position of the seat cushion 10 or backrest 11, once adjusted, remains automatically the same as long as the knobs 22 are not rotated.

Sliding rails 25 are secured at the lower flanges 13 of the lateral parts 14 which are slidingly guided in a known manner on the guide rails 27 arranged in the longitudinal direction at the vehicle floor 26 and of essentially U-shaped cross section. The seat is illustrated in FIGURE 1 of the drawing in its center position. It may be adapted over a relatively wide range by displacement on the guide rails 27 toward the front or rear to the prevailing requirements.

Figure 3:
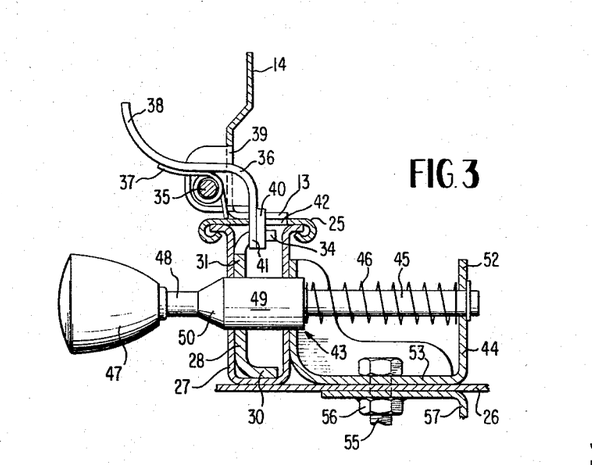
FIGURE 3 is a partial cross sectional view on an enlarged scale taken along line III—III of FIGURE 1.

In order to hold the seat in the desired position, a detent rail 28 is slidingly guided in at least one of the guide rails 27 which detent rail is provided at its upper and lower edge with reinforcing flanges 29 and 30. The detent rail 28 is provided in its upright web portion 31 with a longitudinal slot 32 which is enlarged at approximately equal distances into a series of detent apertures 33. The upper flange 29 of the detent rail 28 is provided in the longitudinal center thereof with a cut-out or aperture 34 into which engages a locking lever 36 under the effect of a spring 37; the lever 36 is pivotally supported in the transverse direction at 35 on the lateral part 14 of the seat disposed thereabove (FIGURE 3). The approximately S-shaped curved locking lever 36, projecting with its handle part 38 sufficiently far out of the seat, is extended through an aperture 39 open in the downward direction and provided in the lateral part 14 over to the inside thereof and projects with its engaging end 41 reinforced at 40 from above through an aperture 42 in the sliding rail 25 into the aperture 34 of the detent rail 28. As a result, thereof, the detent rail 28 is positively coupled with the lateral part 14 of the seat and partakes in the longitudinal displacements thereof provided the locking lever 36 is not upwardly pivoted against the effect of the spring 37 out of the cut-out 34.

The respective position of the detent rail 28 and therewith of the entire seat within or on the guide rail 27 is determined by a locking or securing bolt generally designated by reference numeral 43 (FIGURES 2 and 3) which is supported longitudinally displaceably in mutually aligned apertures provided in the guide rail 27 and in a box-shaped sheet metal bracket 44 secured on the inside thereof. The securing bolt 43 is normally kept in the locking position thereof illustrated in FIGURE 3 by a compression spring 46 placed over its reduced shaft portion 45. By pressing manually on the actuating knob 47 projecting out of the guide rail 27, the bolt 43 can be displaced inwardly against the effect of the spring 46 to such an extent that it enters with its reduced section 48, i.e. having a reduced diametric dimension into the slot 32 of the detent rail 28. The seat together with the detent rail 28 can then be displaced in the longitudinal direction until the bolt 43 again engages with its larger center portion 49 under the effect of the spring 46 into one of the detent apertures 33 of the rail 28. This engagement is facilitated by the conical transition 50 between the parts 48 and 49 of the bolt 43.

The aforedescribed manner of the longitudinal displacement of the seat together with the detent rail 28 is used each time when the seat is to be brought for longer periods of time into a predetermined position matched, for example, to the body size of the driver or to a traffic condition lasting for a longer period of time. However, if it is only a question to displace the seat for a short period of time either forwardly or rearwardly, for example, in order to facilitate to the driver the boarding or leaving or to permit the undertaking of some repair work below the seat, then the locking lever 36 is simply pivoted at its handle part 38 in the counterclockwise direction (FIGURE 3) until its engaging end 41 leaves the cut-out 34 of the detent rail 28. The seat can then be displaced any suitable distance forwardly or rearwardly without the detent rail 28 and if so desired, can also be removed completely out of the guide rails 27.

This type of seat displacement offers the advantage that one can bring the seat thereafter back into the pre-existing position without having to pay special attention, in which the locking lever 36 under the effect of the spring 37 automatically engages again into the aperture 34 of the detent rail 28. In order that this be possible, the engaging end 41 of the locking lever 36 has to be lifted somewhat as soon as the lever 36 arrives within the area of the detent rail 28. For that purpose, the upper flange 29 of the detent rail 28, as can be seen from FIGURE 1, is so constructed that it has two end portions which slightly slant downwardly toward both ends from a longitudinal center portion of the detent rail 28.

For the purpose of the readily detachable securing or fastening of the guide rails 27 and therewith of the entire seat at the vehicle floor 26, box-shaped steel metal brackets 44 and 51 (FIGURE 4) are welded to each guide rail 27 on the inside thereof, i.e., below the seating surface. The vehicle floor 26 is reinforced at the securing places of the seat by means of sectional rails 57 extending below the brackets 44 and 51 and parallel to the guide rails 27.

The rear brackets 51 are provided in the bottom portions 58 thereof with elongated apertures 59 which pass over at the rear end thereof into a large circular aperture 60. The bracket 51 may be emplaced and assembled by means of these circular apertures 60 on mushroom-shaped securing parts 61 (best seen in FIGURE 1) which extend with the shank portion 62 thereof through the vehicle floor 26 and are connected with the respective reinforcing rail 57 disposed therebelow by riveting or welding or in any other suitable manner. The head portions 63 of the securing parts 61 project out of the vehicle floor 26 for such a distance that the brackets 51 after emplacement on the securing parts 61 may be slipped with the smaller ends of the elongated apertures 59 thereof below the head portion 63.

As described above and best seen in FIGURES 1, 2, and 3, the securing bolt 43 is supported in one of the forward brackets 44 which securing bolt is to prevent an unintentional longitudinal displacement of the seat. For that purpose, the forward brackets 44 are each provided on the inner longitudinal sides thereof with an upwardly projecting bearing eye 52. The securing apertures 54 provided in the bottom 53 thereof serve for threaded bolts 55 to be extended therethrough which are extended through corresponding apertures in the vehicle floor 26 and are threaded into welded-on nuts 56 arranged below the rails 57.

For purposes of the safe securing of the seat onto the vehicle floor 26, it is therefore only necessary to place the rear brackets 51 over the securing parts 61, to displace the seat or guide rails slightly toward the rear and to screw the threaded bolts 55 into the welded-on nuts 56. The disengagement or removal of the seat takes place equally simply in reverse manner.

If the seat is intended for a vehicle which is used, in addition to being used as transporting means for human beings and goods, also as equipment carried for agricultural purposes, for the forestry, for the road and highway construction and the like, it happens frequently that the driver, for example, in order to be able to supervise sufficiently and operate adequately equipment arranged at the forward vehicle end during their operation, has to assume for longer periods of time a body position which differs completely from that during normal driving position. In order to protect the driver also in this case against excessively rapid fatigue, the following further measures is provided according to the present invention in addition to the already described far-reaching adjustability of the seat in the longitudinal direction and in the inclination of the seat cushion and backrest.

Figures 4, 5:
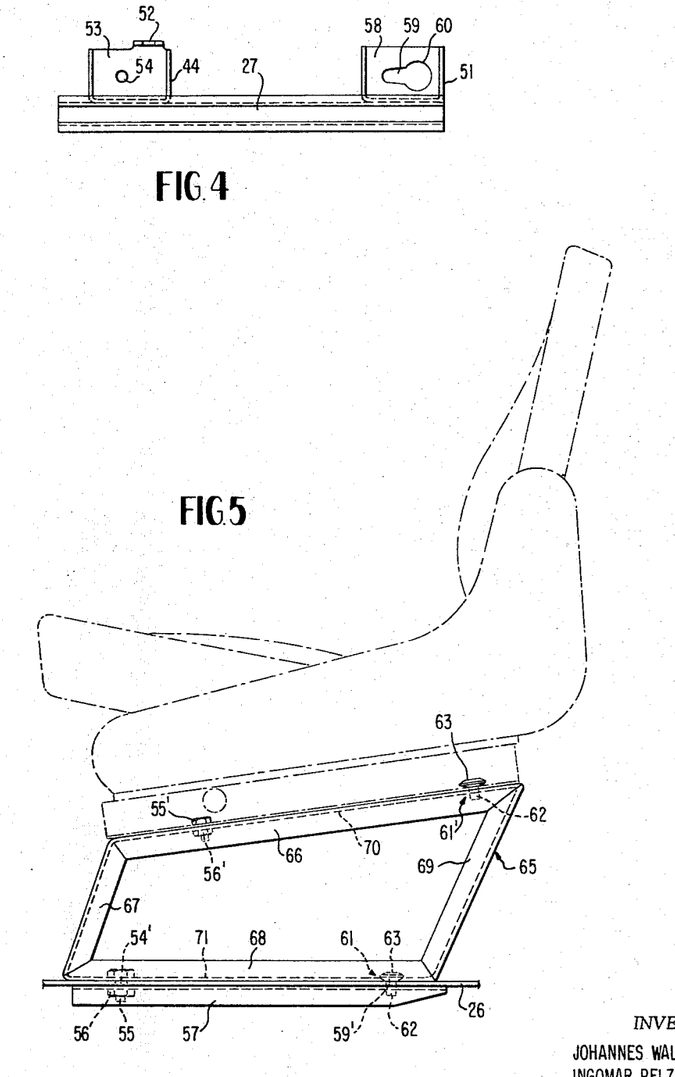
FIGURE 4 is a top plan view on a guide rail of the seat with the securing brackets thereof.
FIGURE 5 is a schematic side elevational view illustrating the intermediate frame in accordance with the present invention together with its securing means at the vehicle floor and also indicating in dash and dot lines a part of the seat resting on the intermediate frame.

As illustrated in FIGURE 5, an intermediate frame, carried along in the vehicle, may be inserted between the vehicle floor 26 and the seat in case of need in a simple manner, by means of which the seat receives a considerably higher and more inclined position than with its direct securing at the vehicle floor. The intermediate frame is constituted by two trapezoidally shaped frames generally designated by reference numeral 65 consisting of mutually welded angle or sectional steel rails 66, 67, 68 and 69 which can be assembled parallel to each other in the plane of the associated securing means 56, 61 and which can be connected with the guide rails 27 as well as with the vehicle floor 26 in a readily and rapidly detachable manner. For purposes of the assembly and for purposes of reinforcement, the intermediate frames 65 may also be connected with each other by appropriate cross pieces (not illustrated). However, the intermediate frames, when separate from each other, can be more readily stowed away in the vehicle in case of non-use.

It is essential that the frames 65 of the intermediate frame are secured at the vehicle floor 26 and at the guide rails 27 of the seat by the same rapid connecting means with which the seat was previously anchored directly at the vehicle floor 26. Accordingly, there are arranged at the horizontal leg portions 70 of the upper angle or sectional rail 66 a welded-on nut 56′ and a mushroom-shaped securing part 61′ at exactly the same distance from each other as the corresponding parts 56 and 61 at the vehicle floor. The same is also true of the securing apertures or slots 54′, 59′ in the horizontal leg portions 71 of the lower sectional rail 68 of the frame.

For purposes of inserting the intermediate frame between the seat and the vehicle floor, it is therefore only necessary to pivot the cushion 10 in the direction of the arrow 72 about the cross shaft 19, to unscrew the threaded bolts 55 disposed therebelow out of the nuts 56 and to pull the seat slightly toward the front until it can be readily lifted with its rear brackets 51 from the mushroom-shaped securing parts 61. After removal of the seat, the frames 65 of the intermediate frame can be connected in its place in an equally simple manner with the vehicle floor 26 and the seat including its guide rails 25 can now be secured with the same means on the upper sectional rail 66 of the frame 65.

A further advantage of the arrangement of the intermediate frame described above resides in the fact that by the insertion thereof between the seat and the vehicle floor, none of the other favorable adjusting possibilities of the seat are lost. Consequently, the seat can be displaced in its raised position, as before, in its longitudinal direction as well as may be changed as heretofore in the inclination of the seat cushion and of its backrest.

While we have shown and described one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are encompassed by the scope of the appended claims.

We claim:

1. An adjustable seat, especially driver seat for commercial type motor vehicles having a vehicle floor, comprising:
    seat frame means having a lower edge portion, cushion means and backrest means on said frame means,
    longitudinal adjusting means for adjusting the seat means in the vehicle longitudinal direction including guide rail means normally secured at the vehicle floor and sliding rail means slidably guided within said guide rail means and secured at the lower edge of the seat frame means,
    rapid detachable connecting means for readily and rapidly detachably connecting the guide rail means at the vehicle floor,
    and intermediate frame means having upper and lower edge portions adapted to be selectively interposed between the guide rail means and the vehicle floor, said itermediate frame means being provided at the lower edge thereof with aperture means for the rapid detachable connecting means arranged at the vehicle floor, and being provided at the upper edge thereof with rapid securing means corresponding in construction and arrangement to the rapid detachable connecting means at the vehicle floor.

2. An adjustable seat, especially driver seat for commercial type motor vehicles having a vehicle floor, comprising:

seat frame means having a lower edge portion, cushion means and backrest means on said frame means, longitudinal adjusting means for adjusting the seat means in the vehicle longitudinal direction including guide rail means normally secured at the vehicle floor and sliding rail means slidably guided within said guide rail means and secured at the lower edge of the seat frame means, rapid detachable connecting means for readily and rapidly detachably connecting the guide rail means at the vehicle floor, and intermediate frame means having upper and lower edge portions adapted to be selectively interposed between the guide rail means and the vehicle floor, said intermediate frame means being provided at the lower edge thereof with aperture means for the rapid detachable connecting means arranged at the vehicle floor, and being provided at the upper edge thereof with rapid securing means corresponding in construction and arrangement to the rapid detachable connecting means at the vehicle floor, said intermediate frame means including a quadrangular sectional steel frame on each side of the seat, the upper leg portion of the sectional steel frame sloping downwardly slightly toward the front.

3. An adjustable seat, especially driver seat for commercial type motor vehicles having a vehicle floor, comprising:

seat frame means having a lower edge portion, cushion means and backrest means supported on said seat frame means, longitudinal adjusting means for adjusting the seat means in the vehicle longitudinal direction including guide rail means normally secured at the vehicle floor and sliding rail means guided within said guide rail means and secured at the lower edge of the seat frame means, and rapid detachable connecting means for readily and rapidly detachably connecting the guide rail means at the vehicle floor, the rapid detachable connecting means including, on the one hand, approximately mushroom-shaped securing bolt means securely arranged near one end of the seat means at the vehicle floor and elongated aperture means enlarged at one end thereof which cooperate with the securing bolt means and which are arranged at the lower edge of the guide rail means, and on the other, nut means securely arranged near the other seat end of the vehicle frame and further aperture means arranged at the bottom edge of the guide rail means for the insertion of securing bolts engaging with the nut means.

4. An adjustable seat, especially driver seat for commercial type motor vehicles having a vehicle floor, comprising:

seat frame means having a lower edge portion, cushion means and backrest means on said frame means, longitudinal adjusting means for adjusting the seat means in the vehicle longitudinal direction including guide rail means normally secured at the vehicle floor and sliding rail means slidably guided within said guide rail means and secured at the lower edge of the seat frame means, rapid detachable connecting means for readily and rapidly detachably connecting the guide rail means at the vehicle floor, and intermediate frame means having upper and lower edge portions adapted to be selectively interposed between the guide rail means and the vehicle floor, said intermediate frame means being provided at the lower edge thereof with aperture means for the rapid detachable connecting means arranged at the vehicle floor, and being provided at the upper edge thereof with rapid securing means corresponding in construction and arrangement to the rapid detachable connecting means at the vehicle floor, the rapid detachable connecting means including, on the one hand, approximately mushroom-shaped securing bolt means securely arranged near one end of the seat at the vehicle floor and at the upper leg portion of the intermediate frame means and elongated aperture means enlarged at one end thereof which cooperate with the securing bolt means and which are arranged at the lower edge of the guide rail means and of the intermediate frame means, and on the other, nut means securely arranged near the other end of the seat at the vehicle floor and at the upper leg portion of the intermediate frame means and further aperture means arranged at the bottom edge of the guide rail means and of the intermediate frame means for the insertion of securing bolts engaging with the nut means.

5. An adjustable seat, especially driver seat for commercial type motor vehicles having a vehicle floor, comprising:

seat frame means having lower edge portion, cushion means and backrest means supported on said seat frame means, longitudinal adjusting means for adjusting the seat means in the vehicle longitudinal direction including guide rail means normally secured at the vehicle floor and sliding rail means guided within said guide rail means and secured at the lower edge of the seat frame means, and rapid detachable connecting means for readily and rapidly detachably connecting the guide rail means at the vehicle floor, the rapid detachable connecting means including, on the one hand, approximately mushroom-shaped securing bolt means securely arranged near one end of the seat means at the vehicle floor and elongated aperture means enlarged at one end thereof which cooperate with the securing bolt means and which are arranged at the lower edge of the guide rail means, and on the other, nut means securely arranged near the other seat end of the vehicle frame and further aperture means arranged at the bottom edge of the guide rail means for the insertion of securing bolts engaging with the nut means, and box-shaped sheet metal bracket means having bottom portions and open toward the top which are laterally secured at the guide rail means and which contain in the bottom portions the elongated aperture means and the further aperture means.

6. An adjustable seat, especially driver seat for commercial type motor vehicles having a vehicle floor, comprising:

seat frame means having a lower edge portion, cushion means and backrest means on said frame means, longitudinal adjusting means for adjusting the seat means in the vehicle longitudinal direction including guide rail means normally secured at the vehicle floor and sliding rail means slidably guided within said guide rail means and secured at the lower edge of the seat frame means, rapid detachable connecting means for readily and rapidly detachable connecting the guide rail means at the vehicle floor, and intermediate frame means having upper and lower edge portions adapted to be selectively interposed between the guide rail means and the vehicle floor, said intermediate frame means being provided at the lower edge thereof with aperture means for the rapid detachable connecting means arranged at the vehicle floor, and being provided at the upper edge thereof with rapid securing means corresponding in construction and arrangement to the rapid detachable connecting means at the vehicle floor, the rapid detachable connecting means including, on the one hand, approximately mushroom-shaped securing bolt means securely arranged near one end of the seat at the vehicle floor and at the upper leg portion of the intermediate frame means and elongated aperture means enlarged at one end thereof which cooperate with the securing bolt means and which are arranged at the lower edge of the guide rail means and of the intermediate frame means, and, on the other, nut means securely arranged near the other end of the seat at the vehicle floor and at the upper leg portion of the intermediate frame means and further aperture means arranged at the bottom edge of the guide rail means and of the intermediate frame means for the insertion of securing bolts engaging with the nut means, and box-shaped sheet metal bracket means having bottom portions and open toward the top which are laterally secured at the guide rail means and which contain in the respective bottom portions the elongated aperture means and the further aperture means.

7. An adjustable seat, especially driver seat for commercial type motor vehicles having a vehicle floor, comprising:

seat frame means having a lower edge portion, cushion means and backrest means supported on said seat frame means, longitudinal adjusting means for adjusting the seat means in the vehicle longitudinal direction including guide rail means normally secured at the vehicle floor and sliding rail means guided within said guide rail means and secured at the lower edge of the seat frame means.

and rapid detachable connecting means for readily and rapidly detachably connecting the guide rail means at the vehicle floor, at least one of said guide rail means being of essentially U-shaped cross section open toward the top, detent rail means connected with the seat means and longitudinally displaceably guided within said one guide rail means, said detent rail means being provided with detent apertures, and a securing bolt extending substantially transversely to the detent rail means and supported within said guide rail means for engagement in said detent apertures.

8. An adjustable seat, especially driver seat for commercial type motor vehicles having a vehicle floor, comprising:

seat frame means having a lower edge portion, cushion means and backrest means supported on said seat frame means, longitudinal adjusting means for adjusting the seat means in the vehicle longitudinal direction including guide rail means normally secured at the vehicle floor and sliding rail means guided within said guide rail means and secured at the lower edge of the seat frame means, and rapid detachable connecting means for readily and rapidly detachably connecting the guide rail means at the vehicle floor, at least one of said guide rail means being of essentially U-shaped cross section open toward the top, detent rail means connected with the seat means and longitudinally displaceably guided within said one guide rail means, said detent rail means being provided with detent apertures, and a securing bolt extending substantially transversely to the detent rail means and supported within said guide rail means for engagement in said detent apertures, said detent rail means being provided with a lonitudinal slot which is enlarged at approximately equal spacings into a series of detent apertures for said securing bolt.

9. An adjustable seat, especially driver seat for commercial type motor vehicles having a vehicle floor, comprising:

seat frame means having a lower edge portion, cushion means and backrest means supported on said seat frame means, longitudinal adjusting means for adjusting the seat means in the vehicle longitudinal direction including guide rail means normally secured at the vehicle floor and sliding rail means guided within said guide rail means and secured at the lower edge of the seat frame means, and rapid detachable connecting means for readily and rapidly detachably connecting the guide rail means at the vehicle floor, at least one of said guide rail means being of essentially U-shaped cross section open toward the top, detent rail means connected with the seat means and longitudinally displaceably guided within said one guide rail means, said detent rail means being provided with detent apertures, and a securing bolt extending substantially transversely to the detent rail means and supported within said guide rail means for engagement in said detent apertures, said detent rail means being provided with a longitudinal shot which is enlarged at approximately equal spacings into a series of detent apertures for said securing bolt, and spring means spring-loading said securing bolt, said securing bolt being longitudinally displaceably supported in the guide rail means against the effect of the spring means, said securing bolt having a center part of relatively greater diameter for engagement into the detent apertures and a relatively smaller diametric section connected with the center part, the diameter of said reduced section corresponding approximately to the width of the longitudinal slot of said detent rail means.

10. An adjustable seat, especially driver seat for commercial type motor vehicles having a vehicle floor, comprising:

seat frame means having a lower edge portion, cushion means and backrest means supported on said seat frame means, longitudinal adjusting means for adjusting the seat means in the vehicle longitudinal direction including guide rail means normally secured at the vehicle floor and sliding rail means guided within said guide rail means and secured at the lower edge of the seat frame means, and rapid detachable connecting means for readily and rapidly detachably connecting the guide rail means at the vehicle floor, box-shaped sheet metal bracket means open toward the top which have upright walls means and are laterally secured at the guide rail means, at least one of said guide rail means being of essentially U-shaped cross section open toward the top, detent rail means connected with the seat means and longitudinally displaceably guided within said one guide rail means, said detent rail means being provided with detent apertures, and a securing bolt extending substantially transversely to the detent rail means and supported within said guide rail means for engagement in said detent apertures, said detent rail means being provided with a longtiudinal slot which is enlarged at approximately equal spacings into a series of detent apertures for said securing bolt, and spring means spring-loading said securing bolt, said securing bolt being longitudinally displaceably supported in the guide rail means against the effect of the spring means, said securing bolt having a center part of relatively greater diameter for engagement into the detent apertures and a relatively smaller diametric section connected with the center part by a conically tapered transition portion, the diameter of said reduced section corresponding approximately to the width of the longitudinal slot of said detent rail means, the securing bolt means being arranged within the area of a forward bracket means formed by a respective guide rail means, and being additionally supported in the upright lateral wall means of the box-shaped bracket means.

11. An adjustable seat, especially driver seat for commercial type motor vehicles having a vehicle floor, comprising:

seat frame means having a lower edge portion, cushion means and backrest means supported on said seat frame means, longitudinal adjusting means for adjusting the seat means in the vehicle longitudinal direction including guide rail means normally secured at the vehicle floor and sliding rail means guided within said guide rail means and secured at the lower edge of the seat frame means, and rapid detachable connecting means for readily and rapidly detachably connecting the guide rail means at the vehicle floor, at least one of said guide rail means being of essentially U-shaped cross section open toward the top, detent rail means connected with the seat means and longitudinally displaceably guided within said one guide rail means, said detent rail means being provided with detent apertures, and a securing bolt extending substantially transversely to the detent rail means and supported within said guide rail means for engagement in said detent apertures, and readily detachable connecting means readily detachably connecting said detent rail means with a lateral part of the seat frame means.

12. An adjustable seat, especially driver seat for commercial type motor vehicles having a vehicle floor, comprising:

seat frame means having a lower edge portion, cushion means and backrest means supported on said seat frame means, longitudinal adjusting means for adjusting the seat means in the vehicle longitudinal direction including guide rail means normally secured at the vehicle floor and sliding rail means guided within said guide rail means and secured at the lower edge of the seat frame means.

and rapid detachable connecting means for readily and rapidly detachably connecting the guide rail means at the vehicle floor, at least one of said guide rail means being of essentially U-shaped cross section open toward the top, detent rail means connected with the seat means and longitudinally displaceably guided within said one guide rail means, said detent rail means being provided with detent apertures, and a securing bolt extending substantially transversely to the detent rail means and supported within said guide rail means for engagement in said detent apertures, and readily detachable connecting means readily detachably connecting said detent rail means with a lateral part of the seat frame means including double-armed locking lever means pivotally supported at the seat frame means against the effect of a spring, said locking lever means projecting with one arm thereof laterally beyond the seat frame means and engaging with the other arm thereof into an aperture provided in the detent rail means.

13. An adjustable seat, especially driver seat for commercial type motor vehicles having a vehicle floor, comprising:

seat frame means having a lower edge portion, cushion means and backrest means supported on said seat frame means, longitudinal adjusting means for adjusting the seat means in the vehicle longitudinal direction including guide rail means normally secured at the vehicle floor and sliding rail means guided within said guide rail means and secured at the lower edge of the seat frame means, and rapid detachable connecting means for readily and rapidly detachably connecting the guide rail means at the vehicle floor, at least one of said guide rail means being of essentially U-shaped cross section open toward the top.

detent rail means connected with the seat means and longitudinally displaceably guided within said one guide rail means, said detent rail means being provided with detent apertures, and a securing bolt extending substantially transversely to the detent rail means and supported within said guide rail means for engagement in said detent apertures, and readily detachable connecting means readily detachably connecting said detent rail means with a lateral part of the seat frame means including double-armed locking lever means pivotally supported at the seat frame means against the effect of a spring, said locking lever means projecting with one arm thereof laterally beyond the seat frame means and engaging with the other arm thereof into an aperture provided in the detent rail means.

said locking lever means being of essentially S-shape and extending said other arm through an aperture provided in the sliding rail means from above into the aperture of the detent rail means.

14. An adjustable seat, especially driver seat for commercial type motor vehicles having a vehicle floor, comprising:

seat frame means having a lower edge portion, cushion means and backrest means supported on said seat frame means, longitudinal adjusting means for adjusting the seat means in the vehicle longitudinal direction including guide rail means normally secured at the vehicle floor and sliding rail means guided within said guide rail means and secured at the lower edge of the seat frame means, and rapid detachable connecting means for readily and rapidly detachably connecting the guide rail means at the vehicle floor, at least one of said guide rail means being of essentially U-shaped cross section open toward the top, detent rail means connected with the seat means and lonigtudinally displaceably guided within said one guide means, said detent rail means being provided with detent apertures, and a securing bolt extending substantially transversely to the detent rail means and supported within said guide rail means for engagement in said detent apertures, the upper edge of the detent rail means being reinforced by flange means having end portions sloping downwardly toward both ends from the longitudinal center portion thereof.

15. An adjustable seat, especially driver seat for commercial type motor vehicles having a vehicle floor, comprising:
seat frame means having a lower edge portion, cushion means and backrest means supported on said seat frame means,
longitudinal adjusting means for adjusting the seat means in the vehicle longitudinal direction including guide rail means normally secured at the vehicle floor and slide means guided within said guide rail means and secured at the lower edge of the seat frame means,
and rapid detachable connecting means for readily and rapidly detachably connecting the guide rail means at the vehicle floor,
box-shoped sheet metal bracket means open toward the top which have upright wall means and are laterally secured at the guide rail means,
at least one of said guide rail means being of essentially U-shaped cross section open toward the top,
detent rail means connected with the seat means and longitudinally displaceably guided within said one guide rail means,
said detent rail means being provided with detent apertures,
and a securing bolt extending substantially transversely to the detent rail means and supported within said guide rail means for engagement in said detent apertures,
said detent rail means being provided with a longitudinal slot which is enlarged at approximately equal spacings into a series of detent apertures for said securing bolt,
and spring means spring-loading said securing bolt, said securing bolt being longitudinally displaceably supported in the guide rail means against the effect of the spring means, said securing bolt having a center part of relatively greater diameter for engagement into the detent apertures and a relatively smaller diametric section connected with the center part by a conically tapered transition portion, the diameter of said reduced section corresponding approximately to the width of the longitudinal slot of said detent rail means, the securing bolt means being arranged within the area of a forward bracket means formed by a respective guide rail means, and being additionally supported in the upright lateral wall means of the box-shaped bracket means, the upper edge of the detent rail means being reinforced by flange means having ends portions sloping downwardly toward both ends from the longitudinal center portion thereof, the effect of the spring means, said securing bolt having a center part of relatively greater diameter for engagement into the detent apertures and a relatively smaller diametric section connected with the center part by a conically tapered transition portion, the diameter of said reduced section corresponding approximately to the width of the longiudtinal slot of said detent rail means,
the securing bolt means being arranged within the area of a forward bracket means formed by a respective guide rail means, and being additionally supported in the upright lateral wall means of the box-shaped bracket means,
and readily detachable connecting means readily detachably connecting said detent rail means with a lateral part of the seat frame means including double-armed locking lever means pivotally supported at the seat frame means against the effect of a spring, said locking lever means projecting with one arm thereof laterally beyond the seat frame means and engaging with the other arm thereof into an aperture provided in the detent rail means,
said locking lever means being of essentially S-shape and extending with said other arm through an aperture provided in the sliding rail means from above into the aperture of the detent rail means,
the upper edge of the detent rail means being reinforced by flange means sloping downwardly toward both ends from the longitudinal center thereof.

16. An adjustable seat, especially driver seat for commercial type motor vehicles having a vehicle floor, comprising:
seat frame means having a lower edge portion, cushion means and backrest means supported on said seat frame means,
longitudinal adjusting means for adjusting the seat means in the vehicle longitudinal direction including guide rail means normally secured at the vehicle floor and sliding rail means guided within said guide rail means and secured at the lower edge of the seat frame means,
and rapid detachable connecting means for readily and rapidly detachably connecting the guide rail means at the vehicle floor,
The rapid detachable connecting means including, on the one hand, approximately mushroom-shaped securing bolt means securely arranged near one end of the seat means at the vehicle floor and elongated aperture means enlarged at one end thereof which cooperate with the securing bolt means and which are arranged at the lower edge of the guide rail means, and on the other, nut means securely arranged near the other seat end of the vehicle frame and further aperture means arranged at the bottom edge of the guide rail means for the insertion of securing bolts engaging with the nut means,
and box-shaped sheet metal bracket means having bottom portions and open toward the top which are laterally secured at the guide rail means and which contain in the bottom portions the elongated aperture means and the further aperture means,
at least one of said guide rail means being of essentially U-shaped cross section open toward the top,
detent rail means connected with the seat means and longitudinally displaceably guided within said one guide rail means,
said detent rail means being provided with detent apertures,
and a securing bolt extending substantially transversely to the detent rail means and supported in said guide rail means for engagement in said detent apertures,
said detent rail means being provided with a longitudinal slot which is enlarged at approximately equal spacings into a series of detent apertures for said securing bolt,
spring means spring-loading said securing bolt, said securing bolt being longitudinally displaceably supported in the guide rail means against the effect of the spring means, said securing bolt having a central part of relatively greater diameter engaging into the detent apertures and a relatively smaller diametric section connected with the central part by a conically tapered portion, the diameter of said reduced section corresponding approximately to the width of the longitudinal slot of said detent rail means,
the securing bolt being arranged within the area of a forward bracket means formed by a respective guide rail means, and being additionally supported in the upright lateral wall means of the box-shaped bracket means.

17. An adjustable seat, especially driver seat for commercial type motor vehicles having a vehicle floor, comprising.
seat frame means having a lower edge portion, cushion means and backrest means supported on said seat frame means,
longitudinal adjusting means for adjusting the seat means in the vehicle longitudinal direction including guide rail means normally secured at the vehicle floor and sliding rail means guided within said guide rail means and secured at the lower edge of the seat frame means, and rapid detachable connecting means for readily and rapidly detachably connecting the guide rail means at the vehicle floor, the rapid detachable connecting means including, on the one hand, approximately mushroom-shaped securing bolt means securely arranged near one end of the seat means at the vehicle floor and elongated aperture means enlarged at one end thereof which cooperate with the securing bolt means and which are arranged at the lower edge of the guide rail means, and on the other, nut means securely arranged near the other seat end of the vehicle frame and further aperture means arranged at the bottom edge of the guide rail means for the insertion of securing bolts engaging with the nut means, and readily disengageable connecting means readily disengageably connecting said detent rail means with a lateral part of the seat frame means.

18. An adjustable seat, especially driver seat for commercial type motor vehicles having a vehicle floor, comprising:

seat frame means having a lower edge portion, cushion means and backrest means supported on said seat frame means, longitudinal adjusting means for adjusting the seat means in the vehicle longitudinal direction including guide rail means normally secured at the vehicle floor and sliding rail means guided within said guide rail means and secured at the lower edge of the seat frame means, and rapid detachable connecting means for readily and rapidly detachably connecting the guide rail means at the vehicle floor, the rapid detachable connecting means including, on the one hand, approximately mushroom-shaped securing bolt means securely arranged near one end of the seat means at the vehicle floor and elongated aperture means enlarged at one end thereof which cooperate with the securing bolt means and which are arranged at the lower edge of the guide rail means, and on the other, nut means securely arranged near the other seat end of the vehicle frame and further aperture means arranged at the bottom edge of the guide rail means for the insertion of securing bolts engaging with the nut means, and box-shaped sheet metal bracket means having bottom portions and open toward the top which are laterally secured at the guide rail means and which contain in the bottom portions the elongated aperture means and the further aperture means, at least one of said guide rail means being of essentially U-shaped cross section open toward the top, detent rail means connected with the seat means and longitudinally displaceably guided within said one guide rail means, said detent rail means being provided with detent apertures, and a securing bolt extending substantially transversely to the detent rail means and supported in said guide rail means for engagement in said detent apertures, said detent rail means being provided with a longitudinal slot which is enlarged at approximately equal spacings into a series of detent apertures for said securing bolt, spring means spring-loading said securing bolt, said securing bolt being longitudinally displaceably supported in the guide rail means against the effect of the spring means, said securing bolt having a central part of relatively greater diameter engaging into the detent apertures and a relatively smaller diametric section connected with the central part by a conically tapered portion, the diameter of said reduced section corresponding approximately to the width of the longitudinal slot of said detent rail means, the securing bolt being arranged within the area of a forward bracket means formed by a respective guide rail means, and being additionally supported in the upright lateral wall means of the box-shaped bracket means, and readily disengageable connecting means readily disengageably connecting said detent rail means with a lateral part of the seat frame means including double-armed locking lever means pivotally supported at the seat frame means against the effect of a spring, said locking lever means projecting with one arm thereof laterally beyond the seat frame means and engaging with the other arm thereof into an aperture provided in the detent rail means, said locking lever means being of essentially S-shape and extending with said other arm through an aperture provided in the sliding rail means from above into the aperture of the detent rail means.

19. An adjustable seat, especially driver seat for commercial type motor vehicles having a vehicle floor, comprising:

seat frame means having a lower edge portion, cushion means and backrest means supported on said seat frame means, longitudinal adjusting means for adjusting the seat means in the vehicle longitudinal direction including guide rail means normally secured at the vehicle rail floor and sliding rail means slidably guided within said guide rail means and secured at the lower edge of the seat frame means, rapid detachable connecting means for readily and rapidly detachably connecting the guide rail means at the vehicle floor, and intermediate frame means adapted to be selectively interposed between the guide rail means and the vehicle floor, said intermediate frame means being provided at the lower edge thereof with aperture means for the rapid detachable connecting arranged at the vehicle floor, and being provided at the upper edge thereof with rapid securing means corresponding in construction and arrangement to the rapid detachable securing means at the vehicle floor, the rapid detachable connecting means including, on the one hand, approximately mushroom-shaped securing bolt means securely arranged near one end of the seat at the vehicle floor and at the upper leg portion of the intermediate frame means and elongated aperture means enlarged at one end thereof which cooperate with the securing bolt means and which are arranged at the lower edge of the guide rail means and of the intermediate frame means, and on the other, nut means securely arranged near the other end of the seat at the vehicle floor and at the upper leg portion of the intermediate frame means and further aperture means arranged at the bottom edge of the guide rail means and of the intermediate frame means for the insertion of securing bolts engaging with the nut means, at least one of said guide rail means being of essentially U-shaped cross section open toward the top, detent rail means connected with the seat means and longitudinally displaceably guided within said one guide rail means, said detent rail means being provided with detent apertures, and a securing bolt extending substantially transversely to the detent rail means and supported in said guide rail means for engagement in said detent apertures.

20. An adjustable seat, especially driver seat for commercial type motor vehicles having a vehicle floor, comprising:

seat frame means having a lower edge portion, cushion means and backrest means supported on said seat frame means, longitudinal adjusting means for adjusting the seat means in the vehicle longitudinal direction including guide rail means normally secured at the vehicle floor and sliding rail means slidably guided within said guide rail means and secured at the lower edge of the seat frame means, rapid detachable connecting means for readily and rapidly detachably connecting the guide rail means at the vehicle floor, and intermediate frame means adapted to be selectively interposed between the guide rail means and the vehicle floor, said intermediate frame means being provided at the lower edge thereof with aperture means for the rapid detachable connecting means arranged at the vehicle floor, and being provided at the upper edge thereof with rapid securing means corresponding in construction and arrangement to the rapid detachable securing means at the vehicle floor, the rapid detachable connecting means including, on the one hand, approximately mushroom-shaped securing bolt means securely arranged near one end of the seat at the vehicle floor and at the upper leg portion of the intermediate frame means and elongated aperture means enlarged at one end thereof which cooperate with the securing bolt means and which are arranged at the lower edge of the guide rail means and of the intermediate frame means, and on the other, nut means securely arranged near the other end of the seat at the vehicle floor and at the upper leg portion of the intermediate frame means and further aperture means arranged at the bottom edge of the guide rail means and of the intermediate frame means for the insertion of securing bolts engaging with the nut means, and readily disengageable connecting means readily disengageably connecting said detent means with a lateral part of the seat frame means.

21. An adjustable seat, especially driver seat for commercial type motor vehicles having a vehicle floor, comprising:

seat frame means having a lower edge portion, cushion means and backrest means supported on said seat frame means, longitudinal adjusting means for adjusting the seat means in the vehicle longitudinal direction including guide rail means normally secured at the vehicle floor and sliding rail means slidably guided within said guide rail means and secured at the lower edge of the seat frame means, rapid detachable connecting means for readily and rapidly detachably connecting the guide rail means at the vehicle floor, and intermediate frame means adapted to be selectively interposed between the guide rails means and the vehicle floor, said intermediate frame means being provided at the lower edge thereof with aperture means for the rapid detachable connecting means arranged at the vehicle floor, and being provided at the upper edge thereof with rapid securing means corresponding in construction and arrangement to the rapid detachable securing means at the vehicle floor, the rapid detachable connecting means including, on the one hand, approximately mushroom-shaped securing bolt means securely arranged near one end of the seat at the vehicle floor and at the upper leg portion of the intermediate frame means and elongated aperture means enlarged at one end thereof which cooperate with the securing bolt means and which are arranged at the lower edge of the guide rail means and of the intermediate frame means, and on the other, nut means securely arranged near the other end of the seat at the vehicle floor and at the upper leg portion of the intermediate frame means and further aperture means arranged at the bottom edge of the guide rail means and of the intermediate frame means for the insertion of securing bolts engaging with the nut means, at least one of said guide rail means being of essentially U-shaped cross section open toward the top, detent rail means connected with the seat means and longitudinally displaceably guided within said one guide rail means, said detent rail means being provided with detent apertures, and a securing bolt extending substantially transversely to the detent rail means and supported in said guide rail means for engagement in said detent apertures, and readily disengageable connecting means readily disengageably connecting said detent means with a lateral part of the seat frame means.

22. An adjustable seat, especially driver seat for commercial type motor vehicles having a vehicle floor, comprising:

seat frame means having a lower edge portion, cushion means and backrest means supported on said seat frame means, longitudinal adjusting means for adjusting the seat means in the vehicle longitudinal direction including guide rail means normally secured at the vehicle floor and sliding rail means slidably guided within said guide rail means and secured at the lower edge of the seat frame means, rapid detachable connecting means for readily and rapidly detachably connecting the guide rail means at the vehicle floor, and intermediate frame means adapted to be selectively interposed between the guide rail means and the vehicle floor, said intermediate frame means being provided at the lower edge thereof with aperture means for the rapid detachable connecting means arranged at the vehicle floor, and being provided at the upper edge thereof with rapid securing means corresponding in construction and arrangement to the rapid detachable securing means at the vehicle floor, the rapid detachable connecting means including, on the one hand, approximately mushroom-shaped securing bolt means securely arranged near one end of the seat at the vehicle floor and at the upper leg portion of the intermediate frame means and elongated aperture means enlarged at one end thereof which cooperate with the securing bolt means and which are arranged at the lower edge of the guide rail means and of the intermediate frame means, and on the other, nut means securely arranged near the other end of the seat at the vehicle floor and at the upper leg portion of the intermediate frame means and further aperture means arranged at the bottom edge of the guide rail means and of the intermediate frame means for the insertion of securing bolts engaging with the nut means, box-shaped sheet metal bracket means having bottom portions and open toward the top which are laterally secured at the guide rail means and which contain in the respective bottom portions the elongated aperture means and the further aperture means, at least one of said guide rail means being of essentially U-shaped cross section open toward the top, detent rail means connected with the seat means and longitudinally displaceably guided within said one guide rail means, said detent rail means being provided with detent apertures, and a securing bolt extending substantially transversely to the detent rail means and supported in said guide rail means for engagement in said detent apertures,
said detent rail means being provided with a longitudinal slot which is enlarged at approximately equal spacings into a series of detent apertures for said securing bolt,
spring means spring-loading said securing bolt means, said securing bolt being longitudinally displaceably supported in the guide rail means against the effect of the spring means, said securing bolt having a central part of relatively greater diameter engaging into the detent apertures and a relatively smaller diametric section connected with the central part by a transition portion, the diameter of said reduced section corresponding approximately to the width of the longitudinal slot of said detent rail means,
the securing bolt being arranged within the area of a forward bracket means formed by said guide rail means, and being additionally supported in the upright lateral wall means of the box-shaped bracket means.

23. An adjustable seat, especially driver seat for commercial type motor vehicles having a vehicle floor, comprising:
seat frame means having a lower edge portion, cushion means and backrest means supported on said seat frame means,
longitudinal adjusting means for adjusting the seat means in the vehicle longitudinal direction including guide rail means normally secured at the vehicle floor and sliding rail means slidably guided within said guide rail means and secured at the lower edge of the seat frame means,
rapid detachable connecting means for readily and rapidly detachably connecting the guide rail means at the vehicle floor, and
intermediate frame means adapted to be selectively interposed between the guide rail means and the vehicle floor, said intermediate frame means being provided at the lower edge thereof with aperture means for the rapid detachable connecting means arranged at the vehicle floor, and being provided at the upper edge thereof with rapid securing means corresponding in construction and arrangement to the rapid detachable securing means at the vehicle floor,
the rapid detachable connecting means including, on the one hand, approximately mushroom-shaped securing bolt means securely arranged near one end of the seat at the vehicle floor and at the upper leg portion of the intermediate frame means and elongated aperture means enlarged at one end thereof which cooperate with the securing bolt means and which are arranged at the lower edge of the guide rail means and of the intermediate frame means, and on the other, nut means securely arranged near the other end of the seat at the vehicle floor and at the upper leg portion of the intermediate frame means and further aperture means arranged at the bottom edge of the guide rail means and of the intermediate frame means for the insertion of securing bolts engaging with the nut means, and
readily disengageable connecting means readily disengageably connecting said detent means with a lateral part of the seat frame means including double-armed locking lever means pivotally supported at the seat frame means against the effect of a spring, said locking lever means projecting with one arm thereof laterally beyond the seat frame means and engaging with the other arm thereof into an aperture provided in the detent rail means,
said locking lever means being of essentially S-shape and extending with said other arm through an aperture provided in the sliding rail means of the seat from above into the aperture means of the detent rail means,
the upper edge of the detent rail means being reinforced by flange means having end portions sloping downwardly toward both ends from the longitudinal center portion thereof.

24. An adjustable seat, especially driver seat for commercial type motor vehicles having a vehicle floor, comprising:
seat frame means having a lower edge portion, cushion means and backrest means supported on said seat frame means,
longitudinal adjusting means for adjusting the seat means in the vehicle longitudinal direction including guide rail means normally secured at the vehicle floor and sliding rail means slidably guided within said guide rail means and secured at the lower edge of the seat frame means,
rapid detachable connecting means for readily and rapidly detachably connecting the guide rail means at the vehicle floor, and
intermediate frame means adapted to be selectively interposed between the guide rail means and the vehicle floor, said intermediate frame means being provided at the lower edge thereof with aperture means for the rapid detachable connecting means arranged at the vehicle floor, and being provided at the upper edge thereof with rapid securing means corresponding in construction and arrangement to the rapid detachable securing means at the vehicle floor,
the rapid detachable connecting means including, on the one hand, approximately mushroom-shaped securing bolt means securely arranged near one end of the seat at the vehicle floor and at the upper leg portion of the intermediate frame means and elongated aperture means enlarged at one end thereof which cooperate with the securing bolt means and which are arranged at the lower edge of the guide rail means and of the intermediate frame means, and on the other, nut means securely arranged near the other end of the seat at the vehicle floor and at the upper leg portion of the intermediate frame means and further aperture means arranged at the bottom edge of the guide rail means and of the intermediate frame means for the insertion of securing bolts engaging with the nut means,
box-shaped sheet metal bracket means having bottom portions and open toward the top which are laterally secured at the guide rail means and which contain in the respective bottom portions the elongated aperture means and the further aperture means,
at least one of said guide rail means being of essentially U-shaped cross section open toward the top,
detent rail means connected with the seat means and longitudinally displaceably guided within said one guide rail means,
said detent rail means being provided with detent apertures, and
a securing bolt extending substantially transversely to the detent rail means and supported in said guide rail means for engagement in said detent apertures,
said detent rail means being provided with a longitudinal slot which is enlarged at approximately equal spacings into a series of detent apertures for said securing bolt,
spring means spring-loading said securing bolt means, said securing bolt being longitudinally displaceably supported in the guide rail means against the effect of the spring means, said securing bolt having a central part of relatively greater diameter engaging into the detent apertures and a relatively smaller diametric section connected with the central part by a transition portion, the diameter of said reduced section corresponding approximately to the width of the longitudinal slot of said detent rail means,
the securing bolt being arranged within the area of a forward bracket means formed by said guide rail means, and being additionally supported in the upright lateral wall means of the box-shaped bracket means, and readily disengageable connecting means readily disengageably connecting said detent means with a lateral part of the seat frame means including double-armed locking lever means pivotally supported at the seat frame means against the effect of a spring, said locking lever means projecting with one arm thereof laterally beyond the seat frame means and engaging with the other arm thereof into an aperture provided in the detent rail means, said locking lever means being of essentially S-shape and extending with said other arm through an aperture provided in the sliding rail means of the seat from above into the aperture means of the detent rail means, the upper edge of the detent rail means being reinforced by flange means having end portions sloping downwardly toward both ends from the longitudinal center portion thereof.

25. An adjustable seat, especially driver seat for commercial type motor vehicles having a vehicle floor, comprising:

seat frame means having a lower edge portion, cushion means and backrest means supported on said seat frame means, longitudinal adjusting means for adjusting the seat means in the vehicle longitudinal direction including guide rail means normally secured at the vehicle floor and sliding rail means guided within said guide rail means and secured at the lower edge of the seat frame means, and rapid detachable connecting means for readily and rapidly detachable connecting the guide rail means at the vehicle floor, the rapid detachable connecting means including, on the one hand, approximately mushroom-shaped securing bolt means securely arranged near one end of the seat means at the vehicle floor and elongated aperture means enlarged at one end thereof which cooperate with the securing bolt means and which are arranged at the lower edge of the guide rail means, and on the other, nut means securely arranged near the other seat end of the vehicle frame and further aperture means arranged at the bottom edge of the guide rail means for the insertion of securing bolts engaging with the nut means, at least one of said guide rail means being of essentially U-shaped cross section open toward the top, detent rail means connected with the seat means and longitudinally displaceably guided within the said one guide rail means, said detent rail means being provided with detent apertures, and a securing bolt extending substantially transversely to the detent rail means and supported in said guide rail means for engagement in said detent apertures.

References Cited by the Examiner
UNITED STATES PATENTS

| | | | |
|---|---|---|---|
| 1,178,214 | 4/1916 | Clark | 297—338 |
| 1,735,518 | 11/1929 | Van Valkenburg et al. | 248—430 |
| 2,715,433 | 8/1955 | Dolgorukov | 248—430 |
| 2,855,026 | 10/1958 | Simons et al. | 287—355 |

FOREIGN PATENTS 779,532   7/1957   Great Britain.

CLAUDE A. LE ROY, *Primary Examiner.*

CHANCELLOR E. HARRIS, *Examiner.*

R. P. SEITTER, *Assistant Examiner.*